No. 656,269. Patented Aug. 21, 1900.
H. F. SANGER.
EYEGLASSES.
(Application filed June 6, 1900.)
(No Model.)

WITNESSES.
Charles T. Hannigan
Annie E. Perce

INVENTOR.
Harry F. Sanger
By Warren R. Perce
Atty.

UNITED STATES PATENT OFFICE.

HARRY F. SANGER, OF LIMA, NEW YORK, ASSIGNOR TO THE BAY STATE OPTICAL CO.

EYEGLASSES.

SPECIFICATION forming part of Letters Patent No. 656,269, dated August 21, 1900.

Application filed June 6, 1900. Serial No. 19,317. (No model.)

*To all whom it may concern:*

Be it known that I, HARRY F. SANGER, a citizen of the United States, residing at Lima, in the county of Livingston and State of New York, have invented certain new and useful Improvements in Eyeglasses, of which the following is a specification, reference being had therein to the accompanying drawings.

Like letters indicate like parts.

Figure 1:
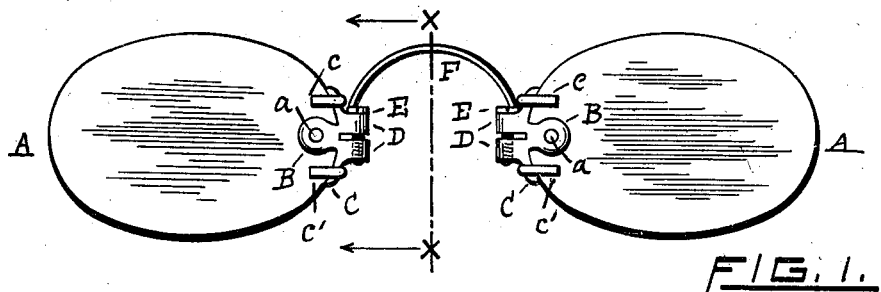
Figure 2:
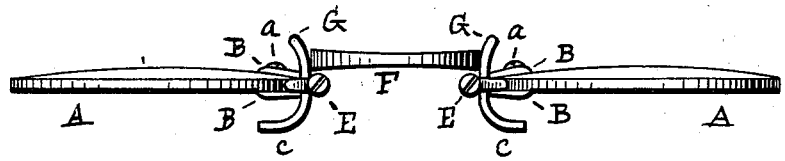
Figure 3:
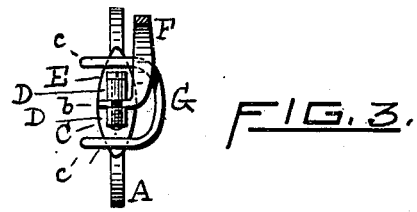
Figure 4:
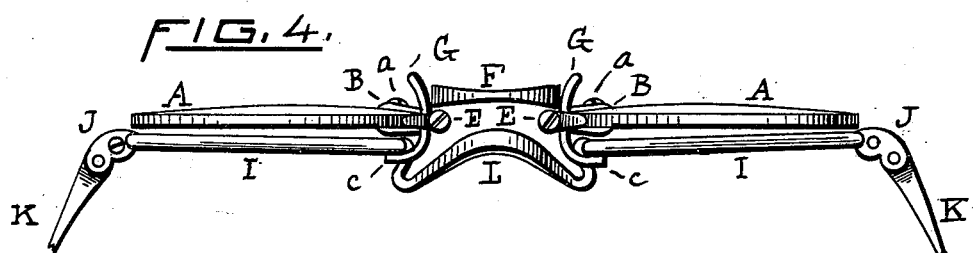
Figure 5:
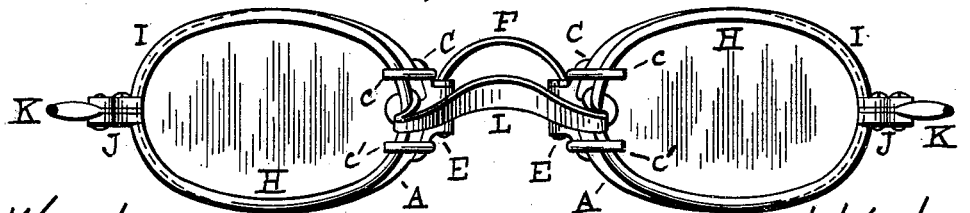

Figure 1 is a rear elevation of my improved eyeglasses. Fig. 2 is a top view of the same. Fig. 3 is a side view as seen on section-line $x\ x$ of Fig. 1. Fig. 4 shows in top view my said improved eyeglasses attached to a pair of spectacles. Fig. 5 is a rear elevation of a pair of spectacles with my improved eyeglasses attached thereto.

My invention relates to that kind of eyeglasses known by the trade as "grab-fronts." Eyeglasses of this sort are used in combination with spectacles in cases where it is desirable to use temporarily lenses of a different power or variety than those with which the spectacles are furnished—as, for example, if the spectacle-lenses are especially fitted to the peculiar condition of the eyes and are designed to enable the sight of distant objects whenever the wearer desires to read a printed or written page, as the spectacles are not adapted for that use, he puts on over the spectacles these supplemental eyeglasses, which are adapted for reading purposes. Such supplemental eyeglasses are supported in position upon the spectacles by various kinds of attachments.

My invention consists in the novel means of manipulating and attaching such eyeglasses to spectacles, as hereinafter particularly described, and as set forth in the claims.

In the drawings, A A are the lenses, and B B are the lens-holders, which project integrally from the curved eye-rim pieces C C, and are secured to the lenses by the screws $a$. Said rim-pieces C C have the integral clamping-jaws D D, which have screw-holes through them for the reception of the clamping-screws E E. The jaws D D are a slight distance apart, as shown in Figs. 1 and 3.

F is a bow-spring whose ends are bent at a right angle, as seen at $b$ in Fig. 3, and inserted between the clamping-jaws D D. The clamping-screws E E draw together the clamping-jaws D D and tighten them upon the bent ends $b$ of the bow-spring F, and so serve to hold the bow-spring firmly in position.

On each rim-piece C is fastened a finger-piece G, which on the front presents the form of a loop slightly curved, as illustrated in Figs. 2 and 4, and the two ends $c\ c'$ thereof, extending to the rear, are curved or bent divergently, as appears in said figures.

In Figs. 4 and 5 I show said improved eyeglasses as attached to a pair of spectacles. In said figures, H H are the lenses, I I the eye-rims, J J the end pieces, K K the temple-arms, and L the nosepiece of a pair of spectacles, all of the usual construction. It is here seen that my improved eyeglasses have been attached on the front of said spectacles by the engagement of the rearwardly-extending bent hooked ends $c\ c'$ of the finger-pieces G with the eye-rims I I of the spectacle-frame, the ends $c$ of said finger-pieces being above the nosepiece L of the spectacle-frame and the ends $c'$ below the same. Said eyeglasses are so attached to the spectacles (the latter being in the usual position upon the face of the wearer) by his seizing with his thumb and forefinger the finger-pieces G G and pinching them inwardly toward each other, thus bringing the lenses A A nearer together and with them the ends $c\ c'$ of the bow-spring F and also the clamping device B C D E. These bent ends $c\ c'$ of the finger-pieces G G are brought into position by the hand between the eye-rims I I of the spectacles, with the hooked ends $c$ above the nosepiece L and the hooked ends $c'$ below said nosepiece. Then as the hold of the thumb and finger upon the finger-pieces G G is relaxed the bow-spring F spreads apart and the hooked ends $c\ c'$ engage the eye-rims I I of the spectacles, as shown in Figs. 4 and 5, and extend to the rear, thus supporting the eyeglasses in wearing position.

It is obvious that my said device is applicable to glasses which have eye-rims extending entirely around the lenses, on the edge thereof, as well as to those whose eye-rims only partially extend on the edges of the lenses, as illustrated in the drawings.

My said supplemental eyeglasses are adapted to be worn attached to other eyeglasses as well as to spectacles.

I claim as a novel and useful invention and desire to secure by Letters Patent—

1. In supplemental eyeglasses adapted to be attached to a pair of spectacles, the combination of two lenses, eye-rims for the same, a clamping-jaw on each eye-rim provided with a screw-hole near its outer end, a clamping-jaw on each eye-rim parallel with the first-named clamping-jaw with a space between them and having a screw-hole near its outer end in alinement with the first-named screw-hole, a bow-spring having its ends bent at an angle and inserted between said pairs of clamping-jaws, respectively, a clamping-screw for each pair of clamping-jaws engaging the same through the alined screw-holes thereof and adapted to compress said clamping-jaws upon the ends of the bow-spring, and finger-pieces projecting at an angle from said rims on the front of said eyeglasses, substantially as described.

2. In supplemental eyeglasses adapted to be attached to a pair of spectacles, the combination of two lenses, eye-rims for the same, a clamping-jaw on each eye-rim provided with a screw-hole near its outer end, a clamping-jaw on each eye-rim parallel with the first-named clamping-jaw with a space between them and having a screw-hole near its outer end in alinement with the first-named screw-hole, a bow-spring having its ends bent at an angle and inserted between said pairs of clamping-jaws, respectively, a clamping-screw for each pair of clamping-jaws engaging the same through the alined screw-holes thereof and adapted to compress said clamping-jaws upon the ends of the bow-spring, and bent prongs projecting from said eye-rims, respectively, at an angle on the rear of said eyeglasses and adapted to engage the eye-rims of said eye-shades, substantially as specified.

3. In supplemental eyeglasses adapted to be attached to a pair of spectacles, the combination of two lenses, eye-rims for the same, a clamping-jaw on each eye-rim provided with a screw-hole near its outer end, a clamping-jaw on each eye-rim parallel with the first-named clamping-jaw with a space between them and having a screw-hole near its outer end in alinement with the first-named screw-hole, a bow-spring having its ends bent at an angle and inserted between said pairs of clamping-jaws, respectively, a clamping-screw for each pair of clamping-jaws engaging the same through the alined screw-holes thereof and adapted to compress said clamping-jaws upon the ends of the bow-spring, finger-pieces projecting at an angle from said rims on the front of said eyeglasses, and bent prongs projecting at an angle from said rims on the rear of said eyeglasses and adapted to engage the eye-rims of said spectacles, substantially as specified.

4. In supplemental eyeglasses adapted to be attached to a pair of spectacles, the combination of two lenses and eye-rims for the same, a bow-spring and means of attaching it to the eye-rims, means connected with the eye-rims adapted when operated to move the lenses nearer each other, a pair of bent parallel prongs extending from each eye-rim to the rear and adapted to engage the adjacent eye-rim of said spectacles, one prong above and the other below the nosepiece of said spectacles, substantially as specified.

5. In supplemental eyeglasses adapted to be attached to a pair of spectacles, the combination of two lenses and eye-rims for the same, a bow-spring and means of attaching it to the eye-rims, means connected with the eye-rims and adapted when operated to move said lenses in relation to each other and bent prongs extending from said eye-rims, respectively, to the rear and adapted to engage the frame of said spectacles, substantially as described.

6. In supplemental eyeglasses adapted to be attached to a pair of spectacles, the combination of two lenses and eye-rims for the same, bent prongs projecting from said eye-rims, respectively, to the rear, and a bow-spring with means of attachment to the eye-rims and adapted by its resilience to engage and hold in engagement said prongs with the eye-rims of said spectacles near the points of the junction of the nosepiece of the spectacles with the eye-rims thereof, substantially as specified.

In testimony whereof I affix my signature in presence of two witnesses.

HARRY F. SANGER.

Witnesses:
H. H. EMMONS,
J. H. BETTINGER.